(12) United States Patent
Kusakari et al.

(10) Patent No.: US 12,491,856 B2
(45) Date of Patent: Dec. 9, 2025

(54) STRUCTURE

(71) Applicant: TOYOTA JIDOSHA KABUSHIKI KAISHA, Toyota (JP)

(72) Inventors: Toshiaki Kusakari, Susono (JP); Hideaki Tanaka, Susono (JP); Takahiro Umehara, Susono (JP); Kenjo Miyashita, Susono (JP); Shinya Yamaguchi, Susono (JP); Yoshihiro Tamura, Susono (JP); Kaisei Hino, Susono (JP); Riyo Hiraiso, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 898 days.

(21) Appl. No.: 17/660,800

(22) Filed: Apr. 26, 2022

(65) Prior Publication Data

US 2022/0348182 A1 Nov. 3, 2022

(30) Foreign Application Priority Data

Apr. 28, 2021 (JP) ................... 2021-075952

(51) Int. Cl.
*B60V 1/14* (2006.01)
*B60L 50/71* (2019.01)
(Continued)

(52) U.S. Cl.
CPC ............. *B60V 1/14* (2013.01); *B60L 50/71* (2019.02); *B60V 3/025* (2013.01);
(Continued)

(58) Field of Classification Search
CPC .. B60V 1/14; B60V 3/025; B60V 1/04; B60V 1/06; B60L 50/71; B60L 2200/10;
(Continued)

(56) References Cited

U.S. PATENT DOCUMENTS 5,655,616 A 8/1997 Witt et al.
8,997,909 B2 * 4/2015 Zonenberg ............ B60V 1/043
180/128

FOREIGN PATENT DOCUMENTS

GB 1242059 A * 8/1967
JP H08505583 A 6/1996
(Continued)

OTHER PUBLICATIONS

Butuzov M A, Amphibious Vehicle, Dec. 15, 2014 (Machine Text Translations of RU-2587190-C1 from PE2E ) (Year: 2014).*

*Primary Examiner* — Jason D Shanske
*Assistant Examiner* — Al-Birr Rahman Chowdhury
(74) *Attorney, Agent, or Firm* — Hunton Andrews Kurth LLP

(57) ABSTRACT

A structure equipped with a fuel cell system, wherein the structure comprises: a skirt configured to form an accumulation space between a bottom of the structure and the ground, an air supplier configured to supply off-gas, which is discharged from the fuel cell system, to at least one space selected from the group consisting of the accumulation space and an internal space of the skirt, and a pressure discharger configured to discharge pressure accumulated in the accumulation space to outside of the skirt from a lower end of the skirt, and wherein lift is imparted to the structure by supplying a predetermined amount of the off-gas from the air supplier to at least one space selected from the group consisting of the accumulation space and the internal space of the skirt.

3 Claims, 1 Drawing Sheet

(51) Int. Cl.
  *B60V 3/02*   (2006.01)
  *H01M 8/04746*   (2016.01)
(52) U.S. Cl.
  CPC ..... *H01M 8/04761* (2013.01); *B60L 2200/10* (2013.01); *H01M 2250/20* (2013.01)
(58) Field of Classification Search
  CPC  B60L 2200/32; B60L 58/33; H01M 8/04761; H01M 2250/20; H01M 8/04014; H01M 8/0408; H01M 8/02; H01M 8/0438; H01M 8/0662; Y02E 60/50
  See application file for complete search history.

(56) References Cited

FOREIGN PATENT DOCUMENTS

| | | | |
|---|---|---|---|
| JP | H11152031 A | | 6/1999 |
| JP | 2018020719 A | | 2/2018 |
| RU | 2587190 C1 | * | 6/2016 |

* cited by examiner

STRUCTURE

TECHNICAL FIELD

The disclosure relates to a structure.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Major mobilities using fuel cells as a power source include a vehicle. Mobilities other than vehicles have been studied.

For example, Patent Literature 1 discloses a flight body that can sufficiently exhibit the characteristics of a mounted battery.

Patent Literature 2 discloses a method for driving a hovercraft and a lifting blower, both of which do not use a fuel cell, can be economically driven, and can further improve the driving condition.

Patent Literature 3 discloses an air cushion vehicle which does not use a fuel cell and which can easily exchange a stern tube seal without docking.

Patent Literature 1: Japanese Patent Application Laid-Open (JP-A) No. 2018-020719
Patent Literature 2: JP-A No. 1996-505583
Patent Literature 3: JP-A No. 1999-152031

A fuel cell is generally used in a manner such that air is supplied to the fuel cell for power generation or cooling, and gas is discharged from the fuel cell after used for power generation or cooling of the fuel cell. Mobilities other than automobiles, such as the flight body disclosed in Patent Literature 1, are used in a similar manner, and the discharged gas (off-gas) is discarded in any case. On the other hand, when a fuel cell and its system are operated as the power source of mobilities, their weights serve as a constraint and lead to poor fuel efficiency. A mobility which not only uses a fuel cell as the power source and but also effectively utilizes the gas discharged from the fuel cell for better fuel efficiency, is not put to practical use yet.

SUMMARY

The present disclosure was achieved in light of the above circumstances. An object of the present disclosure is to provide a structure configured to accumulate a gas used for power generation or cooling of a fuel gas under the bottom of the structure and use the gas pressure as the lift of the structure.

The structure of the present disclosure is a structure equipped with a fuel cell system,
wherein the structure comprises:
a skirt configured to form an accumulation space between a bottom of the structure and the ground,
an air supplier configured to supply off-gas, which is discharged from the fuel cell system, to at least one space selected from the group consisting of the accumulation space and an internal space of the skirt, and
a pressure discharger configured to discharge pressure accumulated in the accumulation space to outside of the skirt from a lower end of the skirt, and
wherein lift is imparted to the structure by supplying a predetermined amount of the off-gas from the air supplier to at least one space selected from the group consisting of the accumulation space and the internal space of the skirt.

The structure may further comprise a controller and a pressure measurer configured to monitor the pressure in the accumulation space.

The controller may impart lift to the structure by controlling the amount of the off-gas supplied from the air supplier to at least one space selected from the group consisting of the accumulation space and the internal space of the internal space, and by controlling the pressure discharged from the pressure discharger to the outside.

The structure of the present disclosure may be a vehicle or a cargo-carrying mobility.

According to the structure of the disclosed embodiments, a gas used for power generation or cooling of a fuel cell can be accumulated under the bottom of the structure, and the gas pressure can be used as the lift of the structure.

BRIEF DESCRIPTION OF THE DRAWINGS

In the accompanying drawings.

DETAILED DESCRIPTION

Figure 1:
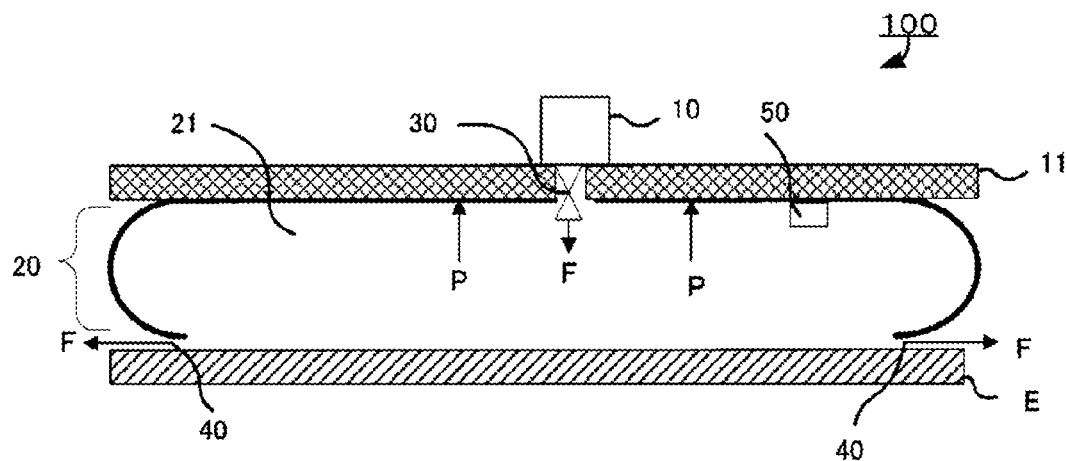
FIG. 1 is a schematic diagram of an example of the structure of the present disclosure.

The structure of the present disclosure is a structure equipped with a fuel cell system,
wherein the structure comprises:
a skirt configured to form an accumulation space between a bottom of the structure and the ground,
an air supplier configured to supply off-gas, which is discharged from the fuel cell system, to at least one space selected from the group consisting of the accumulation space and an internal space of the skirt, and
a pressure discharger configured to discharge pressure accumulated in the accumulation space to outside of the skirt from a lower end of the skirt, and
wherein lift is imparted to the structure by supplying a predetermined amount of the off-gas from the air supplier to at least one space selected from the group consisting of the accumulation space and the internal space of the skirt.

A fuel cell for vehicles requires a large air supply for power generation. $N_2$ and unreacted $O_2$ in the supplied air are all discharged from the fuel cell as large amounts of discharged gas.

Even in the case of an air-cooled fuel cell, the fuel cell is disposed in an engine compartment, and air is used in the same manner as a radiator. Since the fuel cell is basically designed to discard off-gas, which is used to cool down the fuel cell, to the outside, while a part of the off-gas is circulated in some cases, most of the off-gas is discarded as it is and results in energy loss. Since a vehicle equipped with a fuel cell system includes many components such as a fuel cell, a control system and a tank, the weight of the vehicle is often large and lead to poor fuel efficiency.

According to the present disclosure, the off-gas used for power generation or cooling of the fuel cell is accumulated under the bottom of the structure, and the gas pressure is used as the lift of the structure, thereby lifting a heavy object, reducing the apparent weight of the structure, and decreasing the force needed to move the structure. More specifically, the structure of the present disclosure is a hovercraft which is equipped with a fuel cell as the power source and which utilizes off-gas discharged from the fuel cell.

According to the present disclosure, with lifting a large part of the structure by use of the off-gas used for power generation of the fuel cell, the structure is moved by use of the electric power generated by the fuel cell.

As the structure, examples include, but are not limited to, a vehicle such as a car and a motorcycle, and a mobility such as a cargo-carrying mobility that can carry a cargo.

As the structure, examples also include, but are not limited to, a portable, non-fixed generator that can be hand-carried.

The structure of the present disclosure can float in the air even when it is combined with a system such as an emergency power feeding apparatus and the total weight is 200 kg or more. Accordingly, they can be carried by oneself and by hand. Accordingly, it is easy to bring the power feeding apparatus to a place that a power supply vehicle, bus or vehicle cannot enter, by human power. If there is a reserved road, a heavy object such as a bus and a train can be moved by minimal energy while the heavy object floats. The structure of the present disclosure can be easily transported to the inside of a shelter, and it is expected that as an emergency generator, the structure of the present disclosure can supply electric power to a building with no concern for disturbances such as rain and people.

It was demonstrated that a 170 kg vehicle (the structure of the present disclosure) can be reliably lifted at an off-gas flow rate of 400 L/min and be moved with little power.

The structure of the present disclosure includes the skirt.

The off-gas always slightly flows to the outside from under the skirt. As a result, the structure of the present disclosure loses contact with and friction against the ground. Accordingly, the structure can float into the air.

The skirt forms the accumulation space between the bottom of the structure and the ground. The structure of the skirt may be a structure such that the gas pressure applied to the bottom of the structure can be controlled by storing gas under the structure. Also, the structure of the skirt may be the following structure: when the gas pressure is less than a predetermined gas pressure, the skirt is in contact with the ground, and when the gas pressure is equal to or more than the predetermined gas pressure, the skirt can discharge the off-gas or compressed gas compressed in the accumulation space from the part being in contact with the ground to the outside of the accumulation space.

Also, the structure of the skirt may be a bottomless structure such that the bottom of the skirt is opened. In this case, the gas pressure of the inside of the accumulation space is increased by supplying additional gas pressure, and the structure is lifted by the increased pressure.

The skirt may be an expansion and contraction component that is expandable by the supply of off-gas. In this case, the inside of the skirt is expanded by supplying the off-gas; pressure is accumulated in the accumulation space formed between the bottom of the structure and the ground by the skirt; and the structure can be lifted by the rebound of the accumulated pressure. The form of the expanded expansion and contraction component may be a balloon form, an inner tube form or a donut form, for example.

The material for the skirt is not particularly limited, as long as it has pressure resistance and is resistant to the predetermined gas pressure. As the material for the skirt, examples include, but are not limited to, a carbonaceous material, resin and metal.

The structure of the present disclosure includes the air supplier.

The air supplier supplies the off-gas, which is discharged from the fuel cell system, to at least one space selected from the group consisting of the internal space of the skirt and the accumulation space formed between the bottom of the structure and the ground by the skirt.

The air supplier makes it possible to impart lift to the structure by supplying the predetermined amount of the off-gas to at least one space selected from the group consisting of the internal space of the skirt and the accumulation space formed between the bottom of the structure and the ground by the skirt. The predetermined amount of the off-gas may be appropriately set to an amount that allows lift to be imparted to the structure.

The main component of the off-gas may be air that serves as the oxidant gas, cooling air that serves as a refrigerant, or the like. As needed, it may contain hydrogen (fuel gas) or the like.

The air supplier may be an air supply valve. As needed, the air supplier may further include an air supply fan.

The air supply valve may be an oxidant off-gas discharge valve, a fuel off-gas discharge valve, a refrigerant discharge valve, or the like. From the viewpoint of ensuring desired lift, the air supply valve may be at least an oxidant off-gas discharge valve. In addition, a fuel off-gas discharge valve, a refrigerant discharge valve and the like may be disposed as the air supply valve.

The air supply valve is electrically connected to the controller. By opening the air supply valve by the controller, the off-gas is supplied to at least one space selected from the group consisting of the internal space of the skirt and the accumulation space formed between the bottom of the structure and the ground by the skirt.

The air supply fan accelerates the supply of the off-gas to at least one space selected from the group consisting of the internal space of the skirt and the accumulation space formed between the bottom of the structure and the ground by the skirt.

The air supply fan may be electrically connected to the controller, and ON/OFF of the operation of the air supply fan may be controlled by the controller.

The air supply fan may be a cooling fan.

The structure of the present disclosure includes the pressure discharger.

The pressure discharger discharges the pressure accumulated in the accumulation space to the outside of the skirt from the lower end of the skirt. The pressure may be discharged by discharging the off-gas to the outside.

For example, the pressure discharger may be a flow path structure configured to discharge the off-gas or a gas compressed by the accumulation to the outside of the structure. The pressure discharger may be a pressure discharge valve, for example.

The pressure discharge valve is electrically connected to the controller. By opening the pressure discharge valve by the controller, pressure accumulated outside the accumulation space formed between the bottom of the structure and the ground by the skirt, is discharged.

The load that moves the structure can be represented by the following equation (1):

Load=Weight−Lift≥0　　　Equation (1)

The structure floats when the load is 0.

The lift can be represented by the following equation (2):

Lift=Pressure receiving area of the structure×Pressure under the structure　　　Equation (2)

The pressure under the structure can be represented by the following equation (3):

Pressure under the structure=Off-gas flow rate×Pressure loss of the interface between the skirt and the ground　　　Equation (3)

If the structure floats too high, the pressure loss decreases, and the lift decreases. Accordingly, the structure cannot be an air vehicle such as a drone.

When the off-gas flow rate is small, the pressure increases; the structure floats for a moment; the pressure is released; the structure lands on the ground; and then the pressure increases due to the landing of the structure. By repeating the series of the pressure increase and decrease, the load that moves the structure is decreased, while is it not stable. An optimal condition with little load can be realized by the flow of the off-gas, which allows the structure to always float, into at least one space selected from the group consisting of the internal space of the skirt and the accumulation space formed between the bottom of the structure and the ground by the skirt.

The structure of the present disclosure may include the pressure measurer.

The pressure measurer monitors the pressure in the accumulation space.

The pressure measurer may be electrically connected to the controller, and the controller may detect the pressure in the pressure in the accumulation space detected by the pressure measurer.

The pressure measurer may be a conventionally-known pressure sensor.

The structure of the present disclosure may include the controller.

The controller may impart lift to the structure by controlling the amount of the off-gas supplied from the air supplier to at least one space selected from the group consisting of the internal space of the skirt and the accumulation space formed between the bottom of the structure and the ground by the skirt, and by controlling the pressure discharged from the pressure discharger to the outside.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the mobility. The controller may be operable by an external power source even if the ignition switch is turned OFF.

The structure of the present disclosure includes the fuel cell system.

The fuel cell system includes a fuel cell, a fuel gas system, an oxidant gas system and a cooling system.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 600 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a polymer electrolyte such as a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include a microporous layer (MPL) between the catalyst layer and the gas diffusion layer. The microporous layer may contain a mixture of a water repellent resin such as PTFE and an electroconductive material such as carbon black.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing the reaction gas and a fluid such as the refrigerant to flow in the stacking direction of the unit fuel cells. As the refrigerant, for example, cooling gas such as air, water, or a cooling water such as a mixed solution of ethylene glycol and water may be used.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate, a titanium plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel gas system supplies the fuel gas to the anode of the fuel cell. The fuel gas system may include a fuel gas supplier, a fuel gas supply flow path, and a fuel off-gas discharge flow path.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply may be controlled by controlling the opening and closing of the main shutoff valve of the fuel gas supplier, according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

The fuel off-gas discharge flow path may connect the fuel gas outlet of the fuel cell and at least one of the following: the outside of the structure and at least one space selected from the group consisting of the internal space of the skirt and the accumulation space formed between the bottom of the structure and the ground by the skirt. The fuel off-gas discharge flow path supplies the fuel off-gas, which is the fuel gas discharged from the anode of the fuel cell, to at least one space selected from the group consisting of the internal space of the skirt and the accumulation space formed between the bottom of the structure and the ground by the skirt, or the fuel off-gas discharge flow path discharges the fuel off-gas to the outside. The fuel gas outlet may be the fuel gas discharge hole, the anode outlet manifold or the like.

The fuel off-gas discharge flow path may be provided with a fuel off-gas discharge valve (a gas and water discharge valve).

The fuel off-gas discharge valve allows the fuel off-gas, water and the like to be supplied to at least one space selected from the group consisting of the internal space of the skirt and the accumulation space formed between the bottom of the structure and the ground by the skirt, or the fuel off-gas discharge valve allows the fuel off-gas, water and the like to be discharged to the outside of the structure.

The fuel off-gas discharge valve may be electrically connected to the controller, and the flow rate of the fuel off-gas supplied to at least one space selected from the group consisting of the internal space of the skirt and the accumulation space formed between the bottom of the structure and the ground by the skirt, the flow rate of the fuel off-gas discharged to the outside of the structure, or the like may be controlled by controlling the opening and closing of the fuel off-gas discharge valve by the controller. By controlling the opening degree of the fuel off-gas discharge valve, the pressure of the fuel gas supplied to the anode (anode pressure) may be controlled.

The fuel off-gas discharge flow path may join the oxidant off-gas discharge flow path downstream from the fuel off-gas discharge valve.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane and the like, and the oxidant gas that may be supplied to the anode during a purge.

The oxidant gas system supplies the oxidant gas to the cathode of the fuel cell. The oxidant gas system may include an oxidant gas supplier, an oxidant gas supply flow path, an oxidant off-gas discharge flow path and so on.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is operated according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be an oxidant gas supply hole, a cathode inlet manifold, or the like.

The oxidant off-gas discharge flow path connects the oxidant gas outlet of the fuel cell and at least one space selected from the group consisting of the internal space of the skirt and the accumulation space formed between the bottom of the structure and the ground by the skirt. As needed, the oxidant off-gas discharge flow path connects the outside of the structure, the oxidant gas outlet of the fuel cell, and at least one space selected from the group consisting of the internal space of the skirt and the accumulation space formed between the bottom of the structure and the ground by the skirt. The oxidant off-gas discharge flow path allows the oxidant off-gas, which is the oxidant gas discharged from the cathode of the fuel cell, to be supplied to at least one space selected from the group consisting of the internal space of the skirt and the accumulation space formed between the bottom of the structure and the ground by the skirt. As needed, the oxidant off-gas discharge flow path allows the oxidant off-gas to be discharged to the outside of the structure. The oxidant gas outlet may be an oxidant gas discharge hole, a cathode outlet manifold, or the like.

The oxidant off-gas discharge flow path may be provided with an oxidant off-gas discharge valve (an oxidant gas pressure control valve).

The oxidant off-gas discharge valve is electrically connected to the controller. By opening the oxidant off-gas discharge valve by the controller, the oxidant off-gas, which is the reacted oxidant gas, is supplied from the oxidant off-gas discharge flow path to at least one space selected from the group consisting of the internal space of the skirt and the accumulation space formed between the bottom of the structure and the ground by the skirt, or the oxidant off-gas is discharged to the outside of the structure from the oxidant off-gas discharge flow path, as needed. The pressure of the oxidant gas supplied to the cathode (cathode pressure) may be controlled by controlling the opening degree of the oxidant off-gas discharge valve.

The oxidant off-gas discharge flow path may join a refrigerant discharge flow path downstream from the oxidant off-gas discharge valve.

The cooling system cools down the fuel cell. When the refrigerant is cooling water, the cooling system may include a refrigerant supplier, a refrigerant circulation flow path, and so on.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is operated according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

When the refrigerant is air, the cooling system may include a refrigerant supply flow path, a refrigerant discharge flow path and the like.

The refrigerant supply flow path connects the outside of the structure and the refrigerant inlet of the fuel cell. The refrigerant supply flow path allows the supply of the refrigerant from the outside of the structure to the refrigerant inlet of the fuel cell. The refrigerant inlet may be a refrigerant supply hole, a refrigerant inlet manifold or the like.

A pressure loss unit such as a filter for removal of impurities and so on contained in the air, may be disposed in the refrigerant supply flow path.

The refrigerant discharge flow path connects the refrigerant outlet of the fuel cell and at least one space selected from the group consisting of the internal space of the skirt and the accumulation space formed between the bottom of the structure and the ground by the skirt. The refrigerant discharge flow path allow the supply of the refrigerant, which is discharged from the refrigerant outlet of the fuel cell, to at least one space selected from the group consisting of the internal space of the skirt and the accumulation space formed between the bottom of the structure and the ground by the skirt. The refrigerant outlet may be a refrigerant discharge hole, a refrigerant outlet manifold or the like.

A refrigerant discharge valve may be disposed in the refrigerant discharge flow path.

The refrigerant discharge valve is electrically connected to the controller. By opening the refrigerant discharge valve by the controller, the off-gas (the refrigerant) is supplied from the refrigerant discharge flow path to at least one space selected from the group consisting of the internal space of the skirt and the accumulation space formed between the bottom of the structure and the ground by the skirt.

A cooling fan may be disposed in the refrigerant discharge flow path to accelerate the intake of the air (the refrigerant) from the outside of the structure and the supply of the air (the refrigerant) to at least one space selected from the group consisting of the internal space of the skirt and the accumulation space formed between the bottom of the structure and the ground by the skirt.

The cooling fan may be electrically connected to the controller, and ON/OFF of the operation of the cooling fan may be controlled by the controller.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the oxidant gas supplier and the like. The secondary cell may be rechargeable by a power source outside the fuel cell system, such as a household power supply. The secondary cell may be charged by the output power of the fuel cell. The charge and discharge of the secondary cell may be controlled by the controller.

The structure of the present disclosure may include a fuselage.

The fuselage may be a part that becomes the main component of the structure. When the structure is a vehicle, the fuselage may be the body of the vehicle.

The fuselage may be disposed on the surface of the skirt. In other words, the skirt may be disposed beneath the fuselage.

The fuel cell system may be disposed on the fuselage, or it may be housed in the fuselage.

FIG. 1 is a schematic diagram of an example of the structure of the present disclosure. In FIG. 1, F indicates the flow of the off-gas, and P indicates the gas pressure.

In FIG. 1, a structure 100 includes a fuel cell system 10, a fuselage 11, a skirt 20, an air supplier 30, a pressure discharger 40, a pressure measurer 50 and a controller (not shown).

The fuel cell system 10 is disposed on the fuselage 11. The skirt 20 is disposed beneath the fuselage 11.

By the skirt 20, an accumulation space 21 is formed between the bottom of the structure and a ground E.

The air supplier 30 supplies off-gas, which is discharged from the fuel cell system, to the accumulation space 21.

The pressure discharger 40 discharges the off-gas to the outside of the structure 100.

The pressure measurer 50 measures the pressure of the inside of the accumulation space 21.

The controller detects the pressure of the inside of the accumulation space 21, which was measured by the pressure measurer 50; the controller controls the supplied off-gas amount from the air supplier 30 to the accumulation space 21 so that the pressure of the inside of the accumulation space 21 becomes a predetermined pressure; and the controller controls the internal pressure of the accumulation space 21 by controlling the amount of the off-gas discharged from the pressure discharger 40 to the outside of the structure 100. Accordingly, lift to leave the ground E is imparted to the structure 100.

In consideration of the above equations (1) to (3), the predetermined pressure may be appropriately set so that the lift is equal to the weight of the structure.

Figure 2:
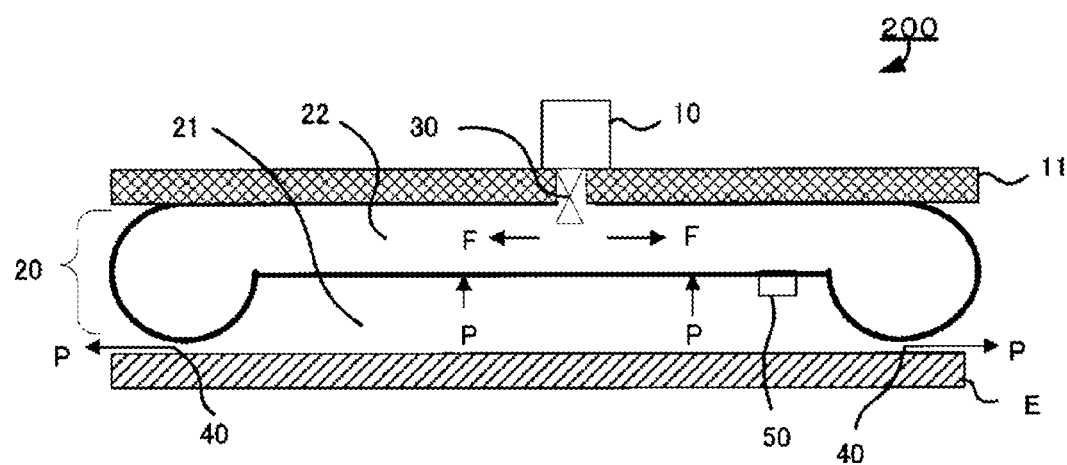
FIG. 2 is a schematic diagram of another example of the structure of the present disclosure.

FIG. 2 is a schematic diagram of another example of the structure of the present disclosure. Of the components shown in FIG. 2, the same components as FIG. 1 will not be described here for simplicity.

For the skirt 20 shown in FIG. 2, the internal space 22 of the skirt 20 is expandable by supplying off-gas. By the expansion of the internal space 22 of the skirt 20, the pressure accumulated in the accumulation space 21 becomes a predetermined pressure or higher. Accordingly, with discharging the pressure to the outside, lift is imparted to a structure 200.

Also in FIG. 2, a controller (not shown) may detect the pressure of the inside of the accumulation space 21, which was measured by the pressure measurer 50; the controller may control the supplied off-gas amount from the air supplier 30 to the internal space 22 of the skirt 20 so that the pressure of the inside of the accumulation space 21 becomes a predetermined pressure; and the controller may control the internal pressure of the accumulation space 21 by controlling the pressure discharged from the pressure discharger 40 to the outside of the structure 200. Accordingly, lift to leave the ground E is imparted to the structure 200 with high accuracy.

REFERENCE SIGNS LIST

10. Fuel cell system
11. Fuselage
20. Skirt
21. Accumulation space
22. Internal space
30. Air supplier
40. Pressure discharger
50. Pressure measurer
100. Structure
200. Structure
E. Ground
F. Off-gas flow
P. Gas pressure

The invention claimed is:

1. A structure equipped with a fuel cell system, wherein the structure is a vehicle or a cargo-carrying mobility, and wherein the structure comprises:
a skirt configured to form an accumulation space between a bottom of the structure and the ground,
an air supplier configured to supply off-gas, which is discharged from the fuel cell system, to at least one space selected from the group consisting of the accumulation space and an internal space of the skirt,
a pressure discharger configured to discharge pressure accumulated in the accumulation space to outside of the skirt from a lower end of the skirt,
a controller, and
a pressure measurer configured to monitor the pressure in the accumulation space,
wherein the air supplier comprises an air supply valve,
wherein the air supply valve is at least one selected from the group consist of an oxidant off-gas discharge valve, a fuel off-gas discharge valve and a refrigerant discharge valve,
wherein the pressure discharger is a pressure discharge valve,
wherein the pressure measurer is a pressure sensor,
wherein the controller imparts lift to the structure by controlling the amount of the off-gas supplied from the air supplier to at least one space selected from the group consisting of the accumulation space and the internal space of the internal space so that a predetermined pressure is maintained in the accumulation space, and by controlling the pressure discharged from the pressure discharger to the outside, and
wherein the predetermined pressure is set so that the lift is equal to the weight of the structure, considering the following equations (1) to (3):

Load=Weight−Lift≥0  Equation (1)

Lift=Pressure receiving area of the structure×Pressure under the structure  Equation (2)

Pressure under the structure=Off-gas flow rate×Pressure loss of the interface between the skirt and ground.  Equation (3)

2. The structure according to claim 1, wherein the air supplier further comprises a cooling fan.

3. The structure according to claim 1, wherein the air supplier comprises an oxidant off-gas discharge valve, a fuel off-gas discharge valve, a refrigerant discharge valve and a cooling fan.

* * * * *